Sept. 15, 1931.  W. G. HOWE  1,823,544
VACUUM HORN CONSTRUCTION FOR TAIL BLEEDING MACHINES
Filed Oct. 10, 1928  2 Sheets-Sheet 1

Witness
David Bair

Inventor
William G. Howe
by Bair, Freeman & Sinclair
Attorneys

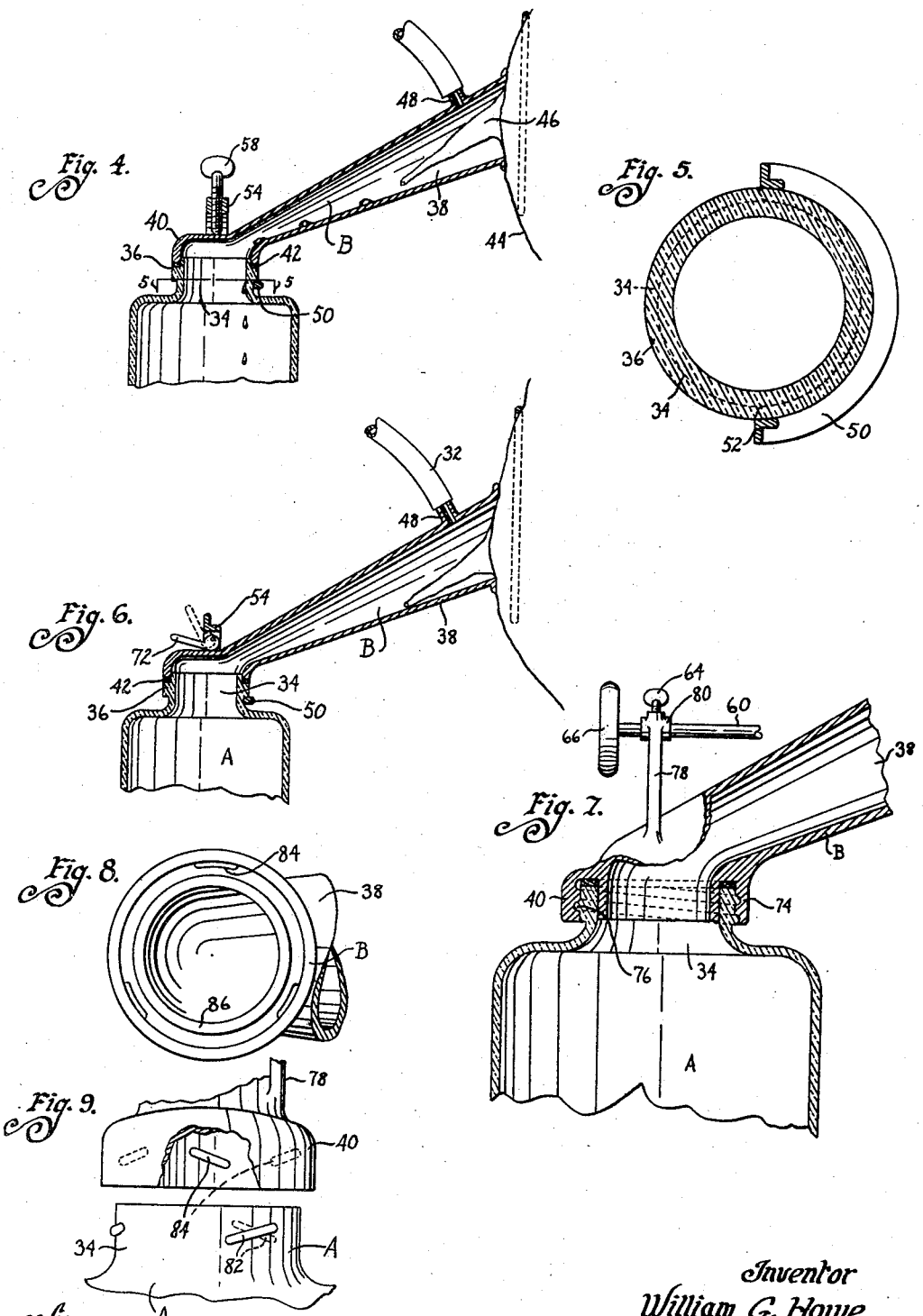

Patented Sept. 15, 1931

1,823,544

UNITED STATES PATENT OFFICE

WILLIAM G. HOWE, OF DES MOINES, IOWA, ASSIGNOR TO SIMPLEX MANUFACTURING COMPANY, OF SIOUX CITY, IOWA, A CORPORATION OF IOWA

VACUUM HORN CONSTRUCTION FOR TAIL-BLEEDING MACHINES

Application filed October 10, 1928. Serial No. 311,629.

My invention relates to vacuum horns used in connection with bottles for receiving blood in the tail-bleeding operation now performed upon hogs for the purpose of manufacturing serum to prevent hog cholera.

It is my object to provide such a horn of simple, durable and comparatively inexpensive construction.

Still a further object is to provide means for clamping the horn to the bottle which is greatly improved over the type of clamping means now in general use.

Still a further object is to provide in connection with the clamping means, a device for engaging the animal to prevent too tight a connection between the animal and the vacuum horn, whereby the flow of blood is greatly facilitated.

In this connection it may here be mentioned that the process of tail-bleeding animals consists in holding the animal in a suitable crate, making an incision in his tail, placing a horn over the tail and in contact with the portion of the animal immediately surrounding the base of the tail (a receiving bottle being secured to the tail) producing a vacuum within the horn and the bottle for withdrawing blood from the animal through the incision in his tail and shaking the bottle to prevent the blood flowing into it from congealing or coagulating.

Still a further object is to provide a rod slidably mounted relative to the clamping device and means for fixing the rod relative to the clamping device, the rod itself terminating adjacent the end of the vacuum horn in a circular like engaging portion adapted to engage the animal and be adjusted relative to the end of the horn.

More particularly, it is my object to provide in connection with the vacuum horn, a clamping device for securely clamping the horn to a bottle in such a manner that a continual air-tight joint is formed between the horn and the bottle for the purpose of entirely eliminating any break in the vacuum occurring during the bleeding operation and which is not loosened while the bottle is being shaken.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 4 is an enlarged sectional view on the line 4—4 of Figure 1.

Figure 5 is a detail sectional view on the line 5—5 of Figure 4.

Figure 6 is a sectional view similar to Figure 4, showing a modified type of clamping device.

Figure 7 shows a horn having screw threads for engaging the blood receiving jar.

Figure 8 is a bottom view of another modified type of horn construction; and

Figure 9 is an elevation of the cap end of a horn and the top end of a bottle showing the connecting devices illustrated in Figure 8 in side elevation.

Figure 1:
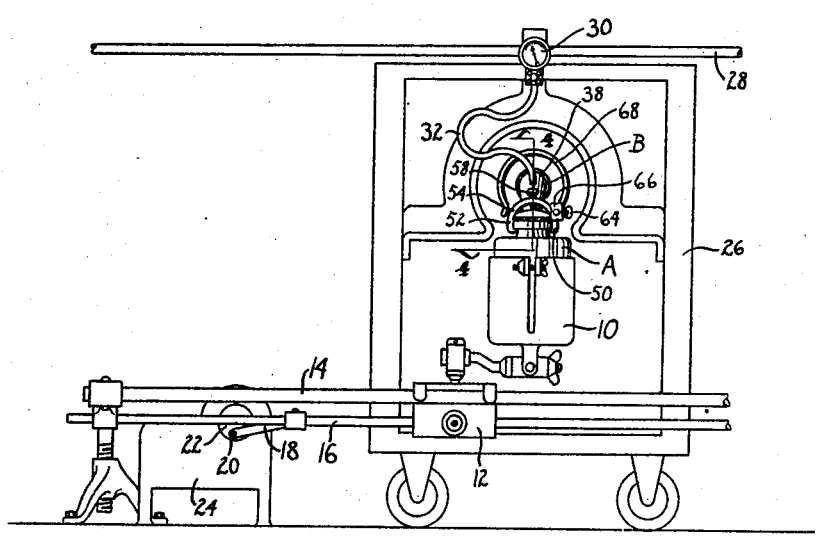
Figure 1 illustrates my improved type of device in use in connection with a tail-bleeding machine.
Figure 2:
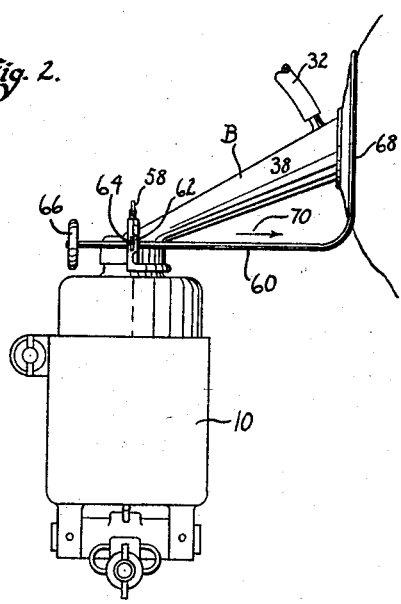
Figure 2 is an enlarged view of the blood receiving bottle, vacuum horn, and container means for the bottle.
Figure 3:
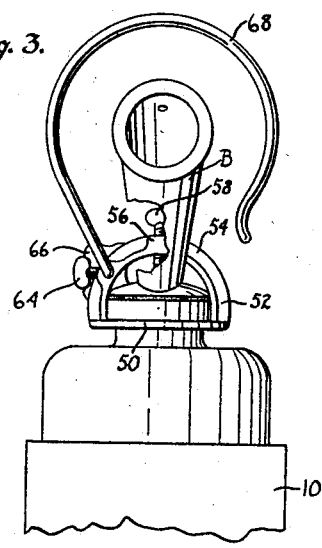
Figure 3 is a front elevation of the same.

On the accompanying drawings, I have used the reference character A to indicate a blood receiving bottle. The bottle A is held in a cup 10 mounted on a slidable carriage 12. The carriage 12 is adapted to slide on guide rods 14 and is connected with a rod 16 which in turn is connected by a link 18 to the crank pin 20 of a disk 22. The disk 22 is rotated by a motor and gearing mechanism contained within the casing 24 for the purpose of shaking the bottle A.

A crate 26 is mounted alongside of the device and is adapted to contain a hog to be operated upon. The apparatus used in the tail-bleeding operation also includes a vacuum line 28, pressure gauge and reducing valve 30 and vacuum hose 32. The parts 10 to 32 form no part of my present invention.

The blood receiving bottle A is provided with a neck 34 and a rib 36 adjacent the top of the neck. My improved type of vacuum horn is indicated generally by the reference character B and includes a horn portion 38 and a cap portion 40. The cap portion 40 is adapted to fit over the neck 34 and against a gasket 42, which is interposed between the cap portion 40 and the rib 36 of the bottle A.

Heretofore, it has been the general practice to use light wire clamps similar to fruit jar clamps for holding the cap portion 40 of the vacuum horn B in engagement with the gasket 42, but they have been found unsatisfactory, as they do not always form a tight joint, with the consequence that during the tail-bleeding operation, when the horn 38 is placed in engagement with the animal 44, his tail 46 extending into the horn for the purpose of drawing blood from the animal through its tail, the clamp sometimes allows a leakage around the gasket, which breaks the vacuum and greatly hinders the operation of drawing blood from the animal.

It is necessary from the beginning to the end of the operation to maintain the vacuum all the time, in order to perform the operation properly. The vacuum of course is caused by connecting the tube 32 to the vacuum horn B by means of a small nipple 48 formed on the horn.

In my device, I have used a clamping mechanism consisting of an arc-shaped bar 50 adapted to engage under the rib 36 and having portions extending upwardly as indicated at 52 and then across the top of the cap portion as indicated at 54. The cross portion 54 is formed with a hub 56 into which a set screw 58 is screw threaded and caused to bear against the cap portion 40, as clearly illustrated in Figures 1 and 4 of the drawings. After the tail-bleeding operation has been performed, it is necessary to further shake the bottle A to prevent congealing of the blood and for doing this it has heretofore been the practice to put a closure cap on the end of the bottle and hold it in position with a wire clamp.

In my construction, I merely replace the vacuum horn B with a closure cap and hold it in position with the clamping means consisting of the members 50, 52, 54, 56 and 58.

In the tail-bleeding process the necessary vacuum for withdrawing blood from the tail 46 of the animal 44 is so great as to cause the engaging end of the horn 38 to press too tightly against the animal with the result that the flow of blood is undesirably hampered. It has therefore been the practice when performing the operation by hand, to pull backwardly on the bottle A and the horn B so as to prevent the engaging end of the horn 38 from causing such restriction of the flow of blood from the animal. It is possible in a mechanical shaking device as shown in Figure 1, to arrange a spring means for this purpose.

In the present device, I use a rod 60 slidably mounted through a boss 62 formed on the clamping means. A set screw 64 is used for holding the rod 60 in any adjusted position. A hand wheel 66 is mounted on one end of the rod 60 and the other end thereof is formed into a loop 68. The loop 68 surrounds the end of the horn 38 which engages the animal 44. The rod 60 may be adjusted in the direction of the arrow 70, whereby the portion 68 of the rod engages the animal 44 and presses against him, thereby pulling backward on the horn 38 by moving the rod 60 relative to the horn.

The set screw 64, after the rod 60 has been adjusted for producing the proper pressure of the portion 68 of the rod 60 on the animal 44, is tightened for the purpose of maintaining such adjustment.

Thus, no matter what position the various parts of the bleeding machine may have relative to the animal, the pressure for pulling the horn 38 away from the animal against the force of the vacuum tending to pull the horn toward the animal remains the same after the rod 60 is once adjusted.

In Figure 6 of the drawings, I have illustrated an eccentric lever 72 to replace the set screw 58 and to serve for the same purpose. This device would be quicker and consequently more convenient to manipulate.

Figure 7 illustrates a modified form of construction in which the cap portion 40 of the vacuum horn B is provided with screw threads 74 adapted to coact with threads 76 formed on the neck 34 of the jar A. In such a construction an arm 78 is provided directly connected or cast integral with the cap portion 40 of the vacuum horn B for the purpose of supporting the slidable rod 60. A set screw 64 would be provided in connection with the boss 80 formed on the arm 78.

In Figures 8 and 9 of the drawings, I have illustrated a form of connection between the cap 40 and the bottle A consisting of inclined lugs 82 formed on the bottle and inclined lugs 84 formed within the cap 40. In this arrangement, a gasket would also be used, seating against the gasket seat 86 of the cap 40.

The lugs 82 and 84 are brought to position out of registry whereupon the cap 40 may be positioned on the jar A and the cap may then be turned part of a turn for causing the lugs to engage each other, which, due to their inclination, will draw the cap 40 down against the gasket.

In this construction, an arm 78 would also be provided for the slidable rod 60.

From the foregoing description, it will be obvious that I have provided a way for adjusting the pressure exerted to pull the horn 38 away from the animal by means of a member adjustable relative to the horn itself and supported relative thereto.

Changes may be made in the various details of my improved vacuum horn construction without departing from the real spirit and purpose of my invention, and it is my intention to cover by my claims, any modified forms of structure or use of mechanical equivalents, which may be reasonably included within their scope.

I claim as my invention:

1. A vacuum horn device comprising a cap portion to coact with the neck of a bottle, a horn portion thereon adapted to engage an animal and means associated with said device for engaging the animal and preventing too tight an engagement between the horn portion and the animal, said means comprising a ring to substantially encircle the end of the horn portion and an arm extending from one side and at right angles to the plane of the ring and means for supporting said arm on said vacuum horn device.

2. A vacuum horn device comprising a cap portion to coact with the neck of a bottle, a horn portion thereon adapted to engage an animal and means associated with said device for engaging the animal and preventing too tight an engagement between the horn portion and the animal, an arm for supporting said means and means for mounting the arm on said device, said last means allowing the rod to slide therein and a device for locking it against sliding.

Des Moines, Iowa, September 12, 1928.

WILLIAM G. HOWE.